Dec. 14, 1971   B. L. JOHNSON   3,626,784
LINKAGE SYSTEM
Filed Oct. 20, 1969   3 Sheets-Sheet 3

BURFORD L. JOHNSON
INVENTOR.

BY

LANE, AITKEN, DUNNER & ZIEMS

United States Patent Office 3,626,784
Patented Dec. 14, 1971

3,626,784
LINKAGE SYSTEM
Burford L. Johnson, Dallas, Tex., assignor to
Forney Engineering Company, Dallas, Tex.
Filed Oct. 20, 1969, Ser. No. 867,637
Int. Cl. G05g *1/00;* F16h *21/18*
U.S. Cl. 74—518                                7 Claims

ABSTRACT OF THE DISCLOSURE

A linkage system for connecting an actuator to an output member, wherein a first linkage arm is connected to the output shaft of the actuator and oscillates in response to an input torque from the actuator output shaft, and a second linkage arm is connected between the first arm and the output member and applies an output torque to the output member in response to the oscillation of the first arm. The effective lever arm of the first linkage arm is regulated so that the output torque to the output member is at least equal to the input torque from the acuator output shaft.

BACKGROUND OF THE INVENTION

The present invention relates to a linkage system for operatively connecting an actuator to an output member, and, more particularly, to such a system in which the output member can be moved in two directions at a different rate of speed by continuous unidirectional rotation of the actuator shaft.

It is common practice to operate valves, such as plug cocks, ball valves and louver dampers, by directly coupling the output shaft of an electric actuator to the operating shaft of the valve. The electric actuator usually consists of a single speed reversible motor with a gear speed reducer to drive the output shaft at a predetermined speed in either direction. However, there are several limitations and disadvantages to this arrangement.

For example, the single speed reversible motor of the actuator does not permit opening the valve at a different rate of speed from that at which it is closed. In many applications it is highly desirable and in some cases, necessary, to open the valve at a different rate than that at which it is closed. For example, in burner control systems it is necessary, for safety reasons, to shut off the fuel supply as quickly as possible in case of loss of ignition or other system malfunctions. However, when putting a burner in service, if the fuel supply valve is opened too quickly, it may momentarily reduce the fuel supply header pressure to a point that would cause loss of ignition on other burners before the header pressure controls could compensate for the change.

Also, due to different port characteristics of various valves and different degrees of over-lap on seating surfaces, it would be highly desirable to be able to control the rate of opening at various points in the opening cycle to obtain optimum performance. This is not possible when the actuator output shaft is directly coupled to the operating shaft of the valve.

Further, when a high speed actuator is directly coupled to the operating shaft of a valve, accurate, quick operating limit switches are necessary to stop the actuator motor at the precise point at which the valve is fully open or fully closed to prevent jamming the valve into the mechanical stops. The tedious adjustment of these limit switches is further complicated by the variable coasting of the electric motor after the limit switches have operated. In some applications, motor brakes have been resorted to in an effort to avoid this jamming. However, this is relatively expensive and not a very satisfactory solution, due to variations in valve torque and brake efficiency. In other applications, shear pins in the couplings between the actuator and valve have been used to prevent damage to reducing gears and valves when jammed at the end of the stroke, but failure of the shear pin puts the valve out of service until the pin is replaced and the cause of the failure checked out.

Still further, the use of a reversible motor actuator directly connected to the valve requires the added cost and complications of a reversing starter for the motor. Also, when the valve must be moved 90° or less from its open to closed position, or visa versa, the wear is concentrated on one fourth of the teeth of the final gear of the speed reducer and thereby shortens the life of the gears.

SUMMARY OF THE INVENTION

It is therefore an object of this invention to provide a linkage system for connecting the output shaft of a single speed motor actuator to the input shaft of a valve, in which one complete revolution of the actuator output shaft in one direction drives the valve through a complete cycle from "closed" to "open" and back to "closed" again, with the time for closing the valve being less than the time required for opening the valve.

Another object of this invention is to provide a linkage system of the above type that will permit regulating the rate of the valve opening and/or closing during the cycle according to predetermined requirements.

Another object of this invention is to provide a linkage system of the above type in which wear is distributed over all of the teeth of the output gear of the actuator, which will at least double the life of the gear.

Another object of this invention is to provide a linkage system of the above type in which it is impossible to overtravel or jam the valve at either end of the stroke, which eliminates the need for a brake on the actuator motor and the need for a shear pin in the coupling.

Another object of this invention is to provide a linkage system of the above type in which the rate of valve rotation is reduced to zero as the valve reaches its open or closed position, so that the limit switch settings that stop the actuator motor at these positions are not critical and are easily adjusted.

Another object of this invention is to provide a linkage system of the above type that will deliver the full output torque of the actuator to the operating shaft of the valve at all positions of the latter regardless of the many speed variations accomplished throughout the opening and closing cycle.

Another object of this invention is to provide a linkage system of the above type that will not produce an excessive radial load on the overhung section of the actuator output shaft, in order to permit the use of any standard, commercially available actuator gear reducer with an output torque rating equal to the required valve input torque.

Another object of this invention is to provide a linkage system of the above type that will permit use of a reversible input when the actuator is provided with a manual control gear. This feature permits an operator to open and close the valve by manually rotating the actuator output shaft 90° in either direction.

These objects are achieved by the linkage system of the present invention which comprises a first linkage member operatively connected to the output shaft of an actuator and adapted to oscillate about a point in response to an unidirectional input torque from said output shaft, a second linkage member operatively connected to said first linkage member and to said output member, said second linkage member adapted to apply a bidirectional output torque to said output member in response to said oscillation of said first linkage member, and means to regulate the effective lever arm of said first linkage member so that the input torque from said output shaft is at least equal to the output torque of said second linkage member.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF THE PREFERRED EMBODIMENTS

Figure 1:
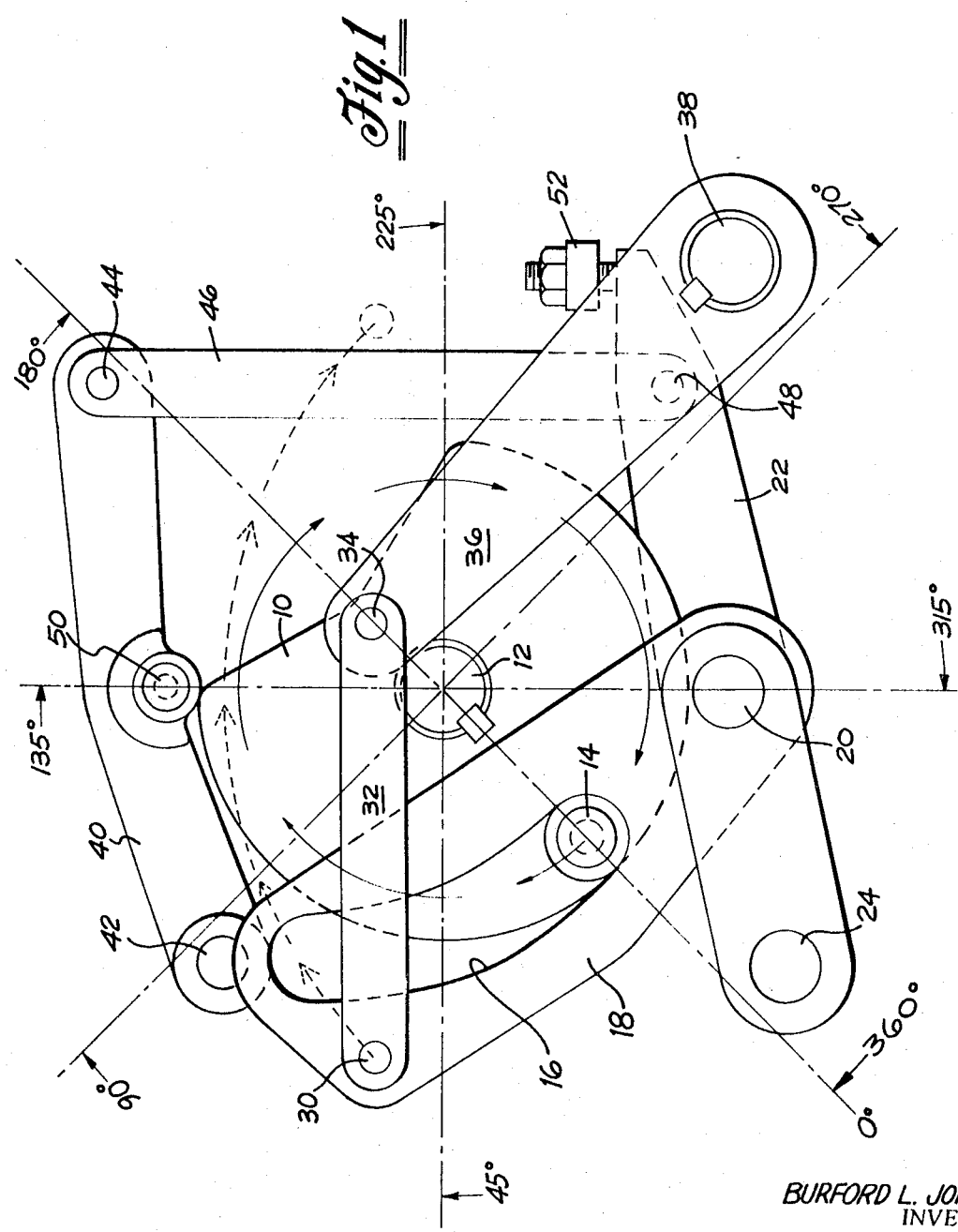
FIG. 1 is a front elevational view of the linkage system of the present invention shown in the valve closed position.

Referring specifically to FIG. 1 of the drawings, the linkage system of the present invention consists of a rotary disc cam 10 mounted on and keyed to an actuator output shaft 12 which becomes the input shaft of the linkage system. A cam follower 14 in the form of a stub shaft, is mounted directly on, and is fixed to, the disc cam 10.

The periphery of the disc cam is concentric with the centerline of the shaft 12 except for a 90° contoured section opposite the cam follower 14. An actuator motor (not shown) drives the shaft 12 in a clockwise direction as viewed in FIG. 1 causing the cam follower 14 to travel in a clockwise path as indicated by the solid arrows.

In FIG. 1, the cam follower 14 is shown in the position corresponding to the "valve closed" position and the radial centerline from the shaft 12 through cam follower 14 is marked 0°. Other radial centerlines from the shaft 12 at 45° intervals are marked in degrees clockwise from the 0° position of the cam follower.

The cam follower 14 operates in a contoured slot 16 of a cam arm 18 which pivots about a pivot shaft 20. This latter shaft is free to rotate in suitable bearings (not shown) in the parallel arms of a yoke 22 which, in turn, pivots about a shaft 24, which is free to rotate in bearings fixed with respect to the linkage housing.

A pin 30 is rigidly attached to the cam arm 18 and a link 32 extends between the pin 30 and a pin 34 in the end of an arm 36 which is fixed to an output shaft 38. The latter shaft is mounted for rotation in fixed bearings supported by the linkage housing and forms the input shaft for an output member, which may be in the form of a valve, for example, so that any rotation of the cam arm 18 about the pivot shaft 20 produces a like rotation of the arm 36 and the shaft 38 and causes a corresponding opening or closing of the valve.

A cam follower arm 40 is also provided which pivots about a pin 42 fixed with respect to the linkage housing. The right hand end of the follower arm 40 is connected, via a pin 44, to a link 46, which, in turn, is pivotally connected, via a pin 48, to one of the parallel arms of the yoke 22. A cam follower 50, in the form of a roller, is rotatably mounted with respect to the follower arm 40, and is adapted to roll on the peripheral surface of the disc cam 10. In the valve closed position of FIG. 1, the follower 50 engages the concentric peripheral surface of the disc cam 10 and therefore holds the right hand end of the yoke arm 22 against a stop screw assembly 52, so that the pivot shaft 20 is normally maintained in the position shown in FIG. 1.

In operation, starting with the cam follower 14 at the valve closed, or 0° position, shown in FIG. 1, the actuator is energized to begin the valve opening operation which causes the input shaft 12 and therefore the disc cam 10 and the cam follower 14 to rotate clockwise at a constant speed about the axis of the shaft 12. The cam follower 14 rises in the contoured slot 16 of the cam arm 18 as it passes the 45° and 90° positions on its way to the 135° position, and in so doing, pulls the upper end of the cam arm 18 with it so that the latter is rotated clockwise about the pivot shaft 20. The pin 30 thus follows a clockwise path indicated by the dotted arrows, and in so doing, pushes the link 32 and therefore the upper end of the arm 36 clockwise, so that the output shaft 38 rotates clockwise toward the valve open position.

When cam follower 14 passes through the 135° position, it reaches the top of the slot 16 and begins to move downward in the slot as it passes on through the 180° and 225° positions. During this motion the cam follower 14 is continuing to pull the cam arm 18 clockwise about the pivot shaft 20, and the pin 30 is continuing to push the link 32, and therefore the arm 36, until the cam follower reaches the 270° position which corresponds to the valve open position as shown in FIG. 2.

As the cam follower 14 approaches the 270° position, a "valve open" limit switch (not shown) opens to de-energize the actuator motor, and the latter coasts to a stop with cam follower 14 approximately at the 270° position. At this position the cam follower 14 is again at the bottom of the slot 16, the pin 30 has traveled through a 90° arc, and the arm 36, as well as the output shaft 38 has traveled through a 90° arc to the valve open position.

Figure 2:
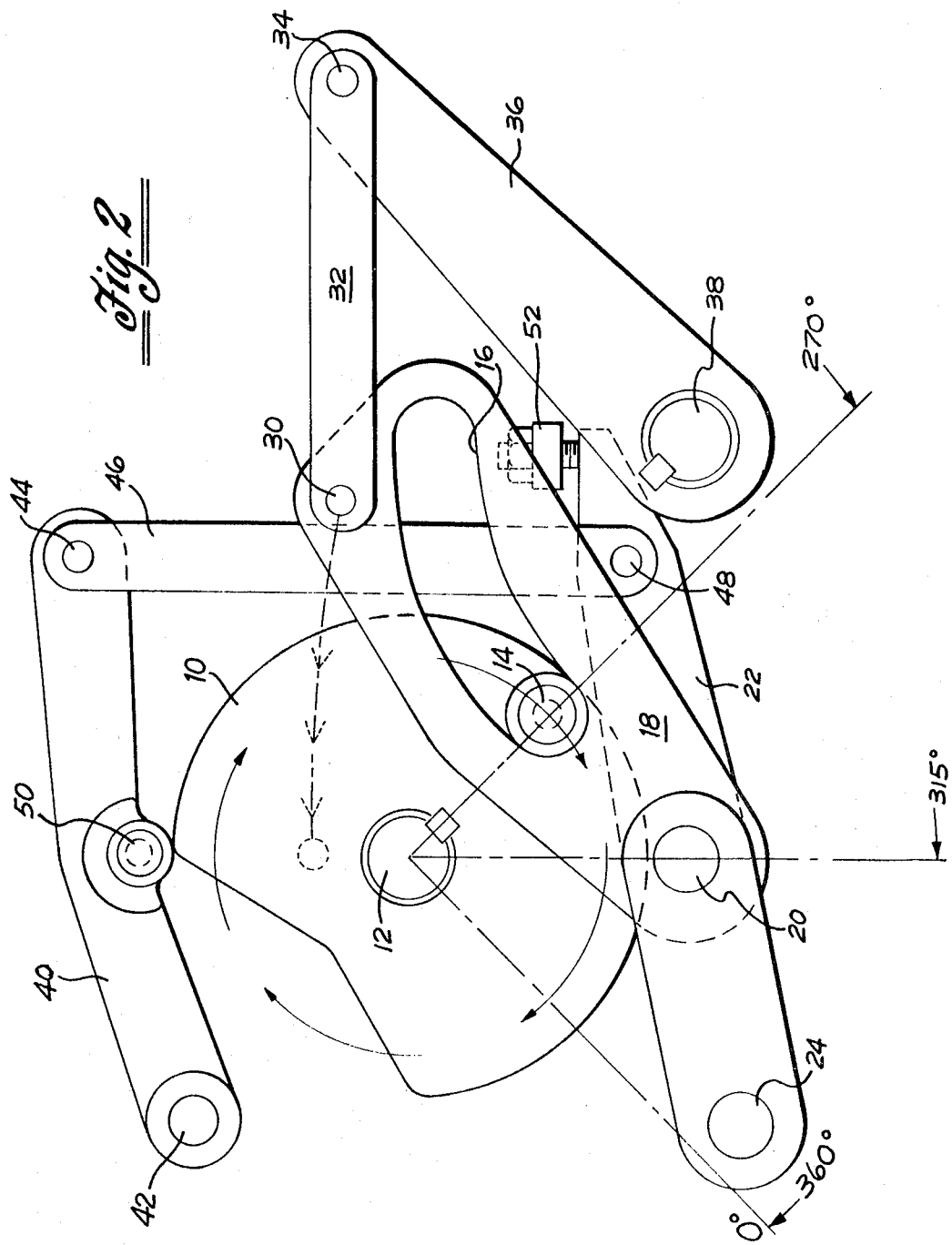
FIG. 2 is a front elevation of the linkage system of the present invention shown at the valve open position.

It is noted that, in the 270° position of the cam follower 14, shown in FIG. 2, the centerlines through the pin 30, the cam follower 14 and the pivot shaft 20 all lie along a common line which is tangent to the arc path of cam follower 14, and that this exists despite slight variations in the position of the cam follower along its arc path. As a result, if the actuator motor had coasted to a stop when the cam follower was a few degrees off the 270° position, it would make no practical difference in the position of the output shaft 38.

Figure 3:
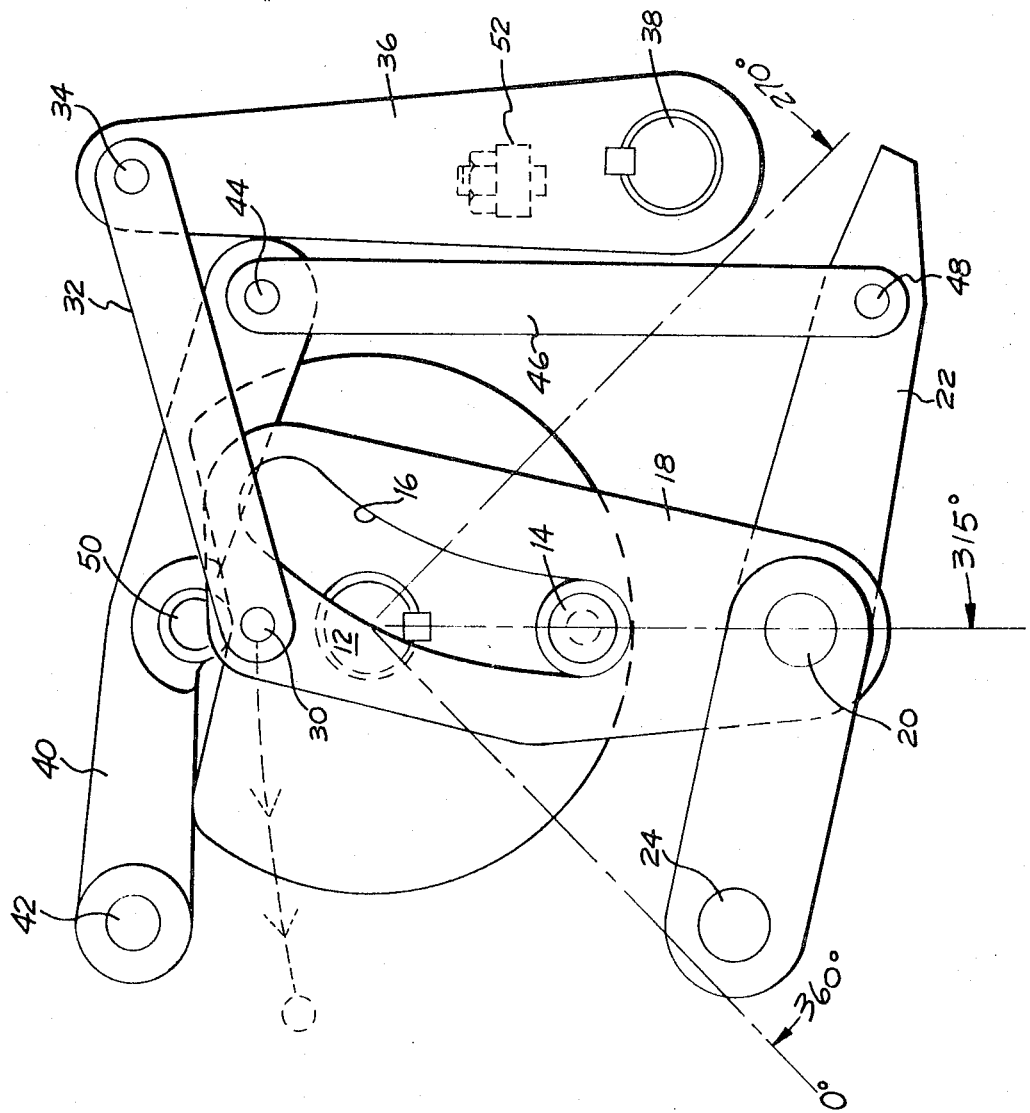
FIG. 3 is a front elevation of the linkage system of the present invention at midstroke of the valve closing operation.

In the 270° position of the cam follower 14 shown in FIG. 2, the cam follower engages the bottom of the slot 16 so that any further rotation of the disc cam 10 and therefore the cam follower 14 clockwise forces the pivot shaft 20 downward. Also in this position, the leading edge of the contoured section of the disc cam 10 is directly under the cam follower 50. Therefore, as the disc cam 10 and the cam follower 14 continue to rotate in a clockwise direction, the cam follower 50 begins to roll down the contoured section of the disc cam 10 and the cam follower 14 bears down in the bottom of the slot 16 forcing the yoke 22 downward. This motion continues until the cam follower 14 reaches the 315° position, during which time the upper end of the cam arm 18 is forced counterclockwise about the shaft 20 so that the pin 30 follows the counterclockwise path indicated by the dotted arrows, and therefore pulls the arm 36 towards the valve closed position. When the cam follower 14 reaches the 315° position, the linkage system is in the position shown in FIG. 3 and the valve is half closed.

As the cam follower 14 passes through the 315° position on its way to the 360° position, the cam follower 50 begins to roll up the rising surface of the contoured section of the disc cam 10 which causes the arm 40 to pivot about the pin 42 and the link 46 to rise. This, in turn, causes the yoke 22 to pivot and the shaft 20 to also rise. As the cam arm 18 continues to rotate counterclockwise about the shaft 20, the pin 30 follows the counterclockwise path indicated by the dotted arrows, and the upper end of the arm 36 is pulled with it so that the output shaft 38 continues to rotate counterclockwise toward the valve closed position. When the cam follower 14 reaches the 360° position, the linkage is back in the position shown in FIG. 1 and the valve is in the closed position.

As the cam follower 14 approaches the 360° position, the arm 36 approaches the valve closed position and a "valve closed" limit switch (not shown) operates to deenergize the actuator motor. The latter coasts to a stop when the cam follower is approximately at the 360° position, which, of course, is the same as the 0° position at the start of the next cycle of valve operation.

It is again noted that the centerlines through the pin 30, the cam follower 14, and shaft 20 form a line which is tangent to the arc path of cam follower 14, so it is of no consequence to the valve position if the coasting of the actuator caused the cam follower 14 to stop a few degrees off of the 360° position.

It is also noted that, as a result of the above arrangement, the full torque from the input shaft 12 is delivered to the output shaft 38 during the complete cycle of operation. This is achieved first of all by insuring that the cam follower 14 produces a torque in the cam arm 18 about its pivot shaft equal to the input torque of the shaft 12. For this to be true, the distance from the center of the cam follower 14 to the center of the shaft 20 must be equal or greater than the distance from the center of cam follower 14 to the center of shaft 12. To meet this requirement, the slot 16 is terminated at the point where these distances are equal in the 270°, 315° and 360° (0°) positions of the cam follower 14, and where the former distance is greater than the latter in the remaining positions of the latter. Secondly, the effective lever arm lengths of the cam arm 18 and the arm 36 are maintained essentially equal due to the regulation of the former length due to the lowering and raising of the shaft 20 as described above.

It is understood that a radial ball bearing may be installed on the hub of disc cam 10 to absorb the radial load from the linkage, so that the load is not imposed on the bearings of the actuator shaft 12.

Many variations can be made to the above without departing from the scope of the basic inventive concept. For example, for an application where the valve rotation was less than 90°, the length of the arm 36 would be increased and the position of the shaft 38 would be lowered proportionately to obtain the desired valve rotation. Of course, in this case, the output torque would be even greater than the input torque.

Also, in applications requiring fast opening and slow closing of the valve, the direction of rotation of the actuator output shaft may simply be reversed. As a result, the valve will be opened as the cam follower 14 moves counterclockwise from the 360° position to the 270° position and the valve will be closed as the cam follower moves counterclockwise from the 270° position to the 0° position.

Further, a manual control gear may be provided so that an operator may open the valve manually by merely rotating the actuator shaft 12 counterclockwise so that the cam follower 14 moves counterclockwise from the 360° position, through the 315° position, to the 270° position to open the valve, without having to rotate the shaft through the 270° required to open the valve if the shaft 12 were rotated clockwise. Of course, the valve can be manually closed by merely rotating the shaft 12 clockwise to cause the cam follower 14 to move from the 270° position through the 315° position to the 360° position.

It is also understood that the invention is not limited to applications involving valves. For example, it may be used in conjunction with actuators controlling variable speed drives, or with any other device that requires the rate of input speed in one direction to be characterized independently or in a specified ratio to the rate of motion in the other direction.

Of course, other variations of the specific construction and arrangement of the linkage system disclosed above can be made by those skilled in the art without departing from the invention as defined in the appended claims.

I claim:

1. A linkage system for connecting a continuously rotatable actuator to an output member, said system comprising a first linkage arm connected to said actuator and adapted to oscillate about a point in response to an input from said actuator, a second linkage arm operatively connected to said output member, a connector arm connecting said first and second linkage arms and adapted to oscillate said second linkage arm in response to oscillation of said first linkage arm and thus apply a torque to said output member, and cam means driven by said actuator for varying the effective length of said first linkage arm so that a greater output torque is applied to said output member during oscillation of said first linkage arm in one direction than during oscillation of said first linkage arm in the other direction.

2. The system of claim 1 wherein said input from said actuator is in the form of an input torque.

3. The system of claim 1 wherein said cam means comprises means for moving said point relative to said actuator in response to a predetermined input.

4. The system of claim 1 wherein said input is unidirectional, and wherein said second linkage arm is adapted to apply a bidirectional output torque to said output member.

5. The system of claim 1 wherein said cam means comprises a disc connected to said actuator and adapted to rotate in response to said input, and a cam follower eccentrically mounted on said disc, said cam follower adapted to engage said first linkage arm and oscillate same in response to said input.

6. The system of claim 5 wherein said input is in the form of an input torque applied by a rotating shaft of said actuator, and wherein the distance from said cam follower to said point is at least equal to the distance from said cam follower to said shaft.

7. The system of claim 5 wherein said disc has a cam surface formed thereon, and wherein said cam means further comprises an additional cam follower engaging said surface and adapted to move said point in response to a predetermined input torque to regulate the effective lever arm of said first linkage arm.

References Cited

UNITED STATES PATENTS

| | | | |
|---|---|---|---|
| 1,101,263 | 6/1914 | Eggart | 74—567 |
| 2,490,555 | 12/1949 | Songer | 74—516 |
| 2,503,469 | 4/1950 | Caldwell | 74—518 X |
| 2,779,563 | 1/1957 | Spence | 74—518 X |
| 2,966,330 | 12/1960 | Binford | 74—516 X |
| 3,096,709 | 7/1963 | Eldred | 74—568 X |
| 3,138,037 | 6/1964 | Schumann | 74—516 |
| 3,263,511 | 8/1966 | Wellstein | 74—516 |

WILLIAM F. O'DEA, Primary Examiner

T. R. HAMPSHIRE, Assistant Examiner

U.S. Cl. X.R.

74—48, 516